United States Patent
Jammoussi et al.

(10) Patent No.: US 9,821,809 B2
(45) Date of Patent: Nov. 21, 2017

(54) MANAGEMENT OF AUTONOMOUS VEHICLE LANES

(71) Applicant: Ford Global Technologies, LLC, Dearborn, MI (US)

(72) Inventors: Hassene Jammoussi, Canton, MI (US); Pankaj Kumar, Dearborn, MI (US); Imad Hassan Makki, Dearborn Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 32 days.

(21) Appl. No.: 14/992,089

(22) Filed: Jan. 11, 2016

(65) Prior Publication Data
US 2017/0197626 A1    Jul. 13, 2017

(51) Int. Cl.
*G01C 22/00*    (2006.01)
*B60W 30/18*    (2012.01)

(52) U.S. Cl.
CPC ... *B60W 30/18163* (2013.01); *B60W 2550/10* (2013.01); *B60W 2550/12* (2013.01); *B60W 2550/20* (2013.01); *B60W 2600/00* (2013.01); *B60W 2720/24* (2013.01)

(58) Field of Classification Search
CPC ....... B60W 30/18163; B60W 2550/10; B60W 2550/12; B60W 2550/20; G06K 9/00791
USPC ................................... 701/25, 300
See application file for complete search history.

(56) References Cited

U.S. PATENT DOCUMENTS

| | | | |
|---|---|---|---|
| 7,205,888 B2 * | 4/2007 | Isaji | G08G 1/166 340/435 |
| 8,352,112 B2 | 1/2013 | Mudalige | |
| 8,849,557 B1 * | 9/2014 | Levandowski | G08G 1/01 701/300 |
| 2014/0156133 A1 | 6/2014 | Cullinane et al. | |
| 2015/0210272 A1 | 7/2015 | Edgren | |

FOREIGN PATENT DOCUMENTS

| | | |
|---|---|---|
| DE | 2014000843 A1 | 8/2014 |
| KR | 101439019 B1 | 9/2014 |

OTHER PUBLICATIONS

Winstead, "Autonomous Lane Changing Using Model Predictive Control", SAE Technical Paper 2005-01-1473, Apr. 11, 2005, Abstract only.

* cited by examiner

*Primary Examiner* — Gertrude Arthur Jeanglaude
(74) *Attorney, Agent, or Firm* — Frank A. MacKenzie; Bejin Bieneman PLC (57) ABSTRACT

A system of one or more computers can be configured to perform particular operations or actions by virtue of having software, firmware, hardware, or a combination of them installed on the system that in operation causes or cause the system to perform the actions. One general aspect includes a system, including a server computer having a processor and a memory, the memory storing instructions executable by the processor such that the computer is programmed to detect a first vehicle in a first lane adjacent to a second lane and plan a first vehicle trajectory for the first vehicle to be placed in a queue in the first lane and, from the queue, transition from the first lane to the second lane based upon at least one determined characteristic of the first vehicle and a second vehicle trajectory and control the first vehicle based upon the first vehicle trajectory.

20 Claims, 4 Drawing Sheets

MANAGEMENT OF AUTONOMOUS VEHICLE LANES

BACKGROUND

Autonomous or partially autonomous vehicles relieve drivers of various driving-related tasks. When operating in autonomous mode, a vehicle can, using on-board sensors, navigate to various locations, allowing the vehicle to travel with minimal, if any, human interaction or even, in some cases, without any passengers. However, vehicles without autonomous capability can pose dangers to, and/or interfere with, vehicles that are fully or partially autonomous.

DETAILED DESCRIPTION

Figure 1:
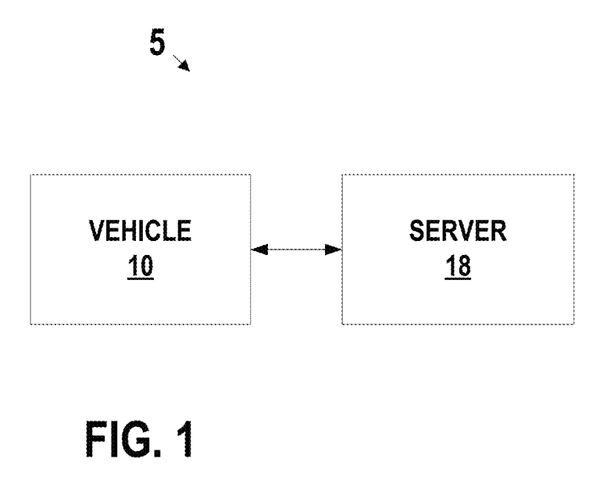
FIG. 1 is a block diagram of an exemplary autonomous vehicle lane access control system.
Figure 2:
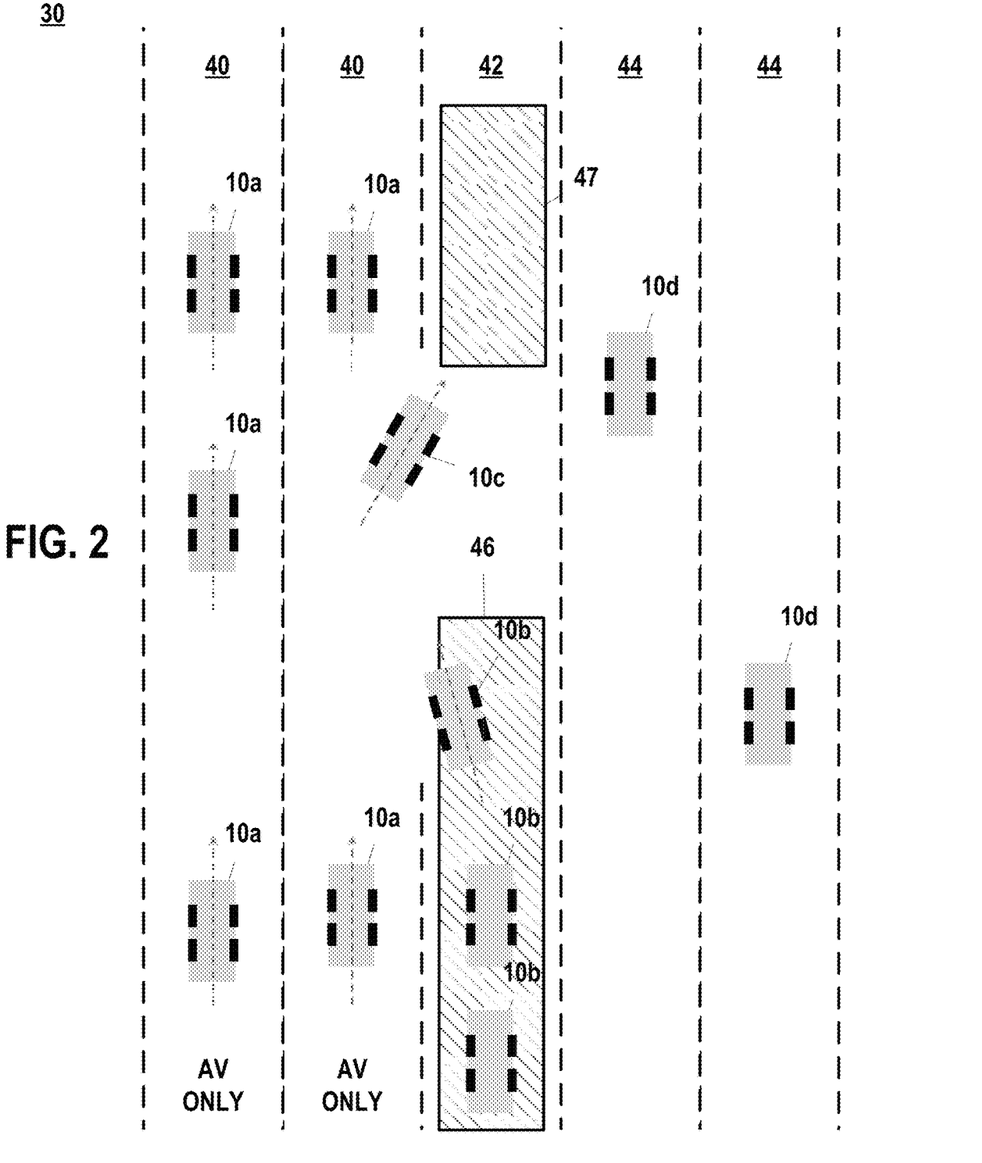
FIG. 2 is a schematic diagram illustrating autonomous vehicles ingressing and egressing a dedicated autonomous vehicle lane.

Referring to FIGS. 1 and 2, illustrated is an exemplary autonomous vehicle lane access control system 5 for regulating autonomous vehicle (AV) 10 lane 40 ingress and egress. Using vehicle-to-infrastructure communications such as are known, the vehicle 10 communicates with a central server 18. For example, now referring to FIG. 2, an autonomous vehicle lane 40 may be entered (ingressed) from an adjacent buffer lane 42 or may exit (egress) the AV lane 40 to the buffer lane 42. The central server 18 may provide instructions to a vehicle 10 for lane 40 ingress and egress. Note that various vehicles 10 in FIG. 2, and the below discussion, are accordingly labeled 10a, 10b, etc., to distinguish between vehicles 10 in various locations, e.g., vehicles 10a in the AV lane 40, vehicles 10b in the adjacent buffer lane 42 vehicle 10c egressing the AV lane 40 and vehicles 10d traveling in a lane 44. Further, in the context of the present disclosure, "adjacent" lanes 40, 42 are immediately next to each other, i.e., have a common border often indicated by shared lane markings (e.g., painted lines, embedded markers, etc.), e.g., a left border of a lane 42 could be a right border of a lane 40.

The system 5 may take many different forms and include multiple and/or alternate components and facilities. While an exemplary system is shown, the exemplary components illustrated are not intended to be limiting. Indeed, additional or alternative components and/or implementations may be used.

Continuing with FIGS. 1 and 2, an AV lane 40 is a dedicated travel lane populated with vehicles 10a in an autonomous, i.e., self-driving, mode, i.e., where each of steering, propulsion (e.g., throttle in an internal combustion engine), and braking are controlled without human intervention. Alternatively, the vehicle 10a can also be a semiautonomous vehicle (SV) operated in an autonomous mode of operation, i.e., a semiautonomous vehicle is one that may operate with some or all of propulsion, steering, and braking under human control, but can be switched to a fully autonomous mode in which each of these are performed without human intervention. In a semiautonomous vehicle as that term is used herein, for example, when an operator of the vehicle 10a wishes to travel in the AV lane 40, the human operator can switch the mode of the semiautonomous vehicle into an autonomous mode, thus permitting the vehicle to operate in the AV lane 40.

The AV lane 40 has a collection of vehicle detection sensors (e.g., radar or lidar sensors), lane proximity sensors, cameras and communication devices (not shown), each communicatively coupled to an AV roadway infrastructure server 18. The lane proximity sensor is used for vehicle detection and surveillance. The lane proximity sensor may include three components: a transducer, a signal processing device, and a data processing device. The transducer detects the passage or presence of a vehicle or its axles. For example, a pneumatic road tube sensor can send a burst of air pressure along a rubber tube when the vehicle's tires pass over the tube. The pressure pulse closes an air switch, producing an electrical signal that is transmitted to a signal-processing device that typically converts the transducer output into an electrical signal. The data-processing device usually includes computer hardware and firmware that converts the electrical signal into traffic parameters.

Another type of lane proximity sensor is an inductive loop detector. A wire loop embedded in the roadway is excited with signals whose frequencies range from 10 KHz to 50 KHz. The loop operates as an inductive element in conjunction with the signal processing device. When a vehicle stops on or passes over the loop, the inductance of the loop is decreased. The decreased inductance increases the oscillation frequency and causes the electronics unit to send a pulse to the data processing device, indicating the presence or passage of a vehicle. The data supplied by conventional inductive loop detectors are vehicle passage, presence, count, and occupancy. Although loops cannot directly measure speed, speed can be determined, as will be understood, using a two-loop speed trap or a single loop detector to provide inputs including loop length, average vehicle length, time over the detector, and number of vehicles counted.

A third type of lane proximity sensor is a laser measurement device which projects a beam of visible laser light that creates a spot on a vehicle surface. Reflected light from the surface is viewed from an angle by a camera inside the laser measurement device. The vehicle's distance from a lane boundary is computed from the image pixel data using a signal processing device and the measurement principle is called triangulation.

Detection sensors report to the server 18 the presence and a vehicle velocity of any vehicle 10a traversing the AV lane 40. Cameras can also provide data that can be used, e.g., according to known image processing techniques, to detect and report the presence and velocity of any vehicle 10a in the AV lane 40. Infrastructure vehicle communications devices permit the vehicle 10a to communicate with the AV roadway infrastructure server 18; for example, the vehicle 10a can report its trajectory, which can include a geolocation and a velocity along with an identification of the vehicle 10a to the server 18. The collected information can be stored on the server 18 as a roadway infrastructure network data.

A vehicle 10 can communicate with the server 18 via one or more known mechanisms such as one or more of a radio frequency communications link, a fiber optic link, a dedicated network link, the Internet, etc. One possible manner of communications is via dedicated short range communications (DSRC), devices for such communications being known. DSRC devices are one-way or two-way short-range to medium-range wireless communication radios specifically designed for automotive use. The Institute of Electrical and Electronics Engineers (IEEE) has developed a corresponding set of protocols and standards for DSRC devices, for example, the IEEE 802.11p DSRC networking layer standard is an enhancement of the IEEE 802.11 standard. Another IEEE DSRC standard is the IEEE 1609 standard which comprises a family of standards for wireless access in vehicular environments (WAVE). The IEEE 1609 standard focuses on resource management, security and multichannel operations.

The buffer lane 42 also has its own local collection of vehicle detection sensors, cameras and/or infrastructure vehicle communication devices (not shown) connectively coupled to a server 18 on the lane 42 can include one or more waiting zones 46 and/or a semiautonomous merge zones 47. The detection sensors, much like the sensors and cameras in the AV lane 40, report the presence and velocity of any AV 10b in the buffer lane 42. As mentioned above, the infrastructure vehicle communications devices permit AVs 10, such as an AV 10b in a buffer lane 42, to communicate with the server 18. For example, the AV 10 can report an identifier for the AV 10 that the server 18 can use to determine vehicle 10 capabilities, e.g., with respect to steering, acceleration, etc., and/or the AV 10 can report its acceleration capabilities, velocity capabilities, destination, and/or other information relevant to determining a lane of travel for the AV 10 to the to the server 18.

The waiting zone 46 of the buffer lane 40 is an area where an AV 10b can be held in a queue until the processing device 12 determines an appropriate merge spot and a release time for the AV 10 to ingress the AV lane 40. The semiautonomous merge zone 47 is an area monitored for obstructing vehicles which may impede the egress of an egressing vehicle 10a from the AV lane 40 into the buffer lane 42. For example, the egressing vehicle 10b can be traveling at 70 m.p.h. when leaving the AV lane 40, the server 18 can detect the presence of a vehicle or obstruction in the semiautonomous merge zone 47 and either can inform the egressing vehicle 10b, which in turn will calculate an appropriate deceleration, or can prevent the egressing vehicle 10a from departing the AV lane 40, i.e., by providing a message to the vehicle 10a.

The server 18 typically contains a processor and a memory, the memory storing instructions executable by the processor. The server 18 memory may also store various data, e.g., data collected from the buffer lane 42 infrastructure server 18, the AV roadway infrastructure server 18 and the AV 10, weather data, traffic data and any other pertinent infrastructure information. The serve 18 can include one or more physical devices at one or more physical locations. Further, the server 18 can be communicatively coupled to or could include other known infrastructure servers, such a traffic server, a weather server 18 for a traffic report and a weather report. The traffic report, for example, can contain information regarding the traffic flow (e.g., a traffic density measured by a number of vehicles passing a point within a specified time) in the AV lane 40, or an incident such as a collision, stalled vehicle, etc., at or within a predetermined distance of an AV lane 40 egress point. Likewise, a weather report, for example can contain the weather conditions along the AV lane 40 or the weather conditions at the egress points.

The server 18, using the above information and data, can plan an AV vehicle 10 trajectory. The AV vehicle trajectory includes a strategy (e.g., planned path, acceleration, velocity, etc.) and a release time to begin the ingress of the AV 10 into the AV lane 40. As discussed above, the AV 10 is typically an autonomous vehicle or a semiautonomous vehicle in autonomous mode. An autonomous vehicle 10 can typically navigate and traverse roadways without input from a human driver. For example, as mentioned above, each of propulsion (e.g., an electric motor and/or internal combustion engine), braking, and steering could be controlled by a vehicle 10 computer or, in a semi-autonomous mode, one or two of these three subsystems could be so controlled.

The AV 10 can send a vehicle status to the server 18 for use in determining the AV vehicle trajectory. The vehicle status can include one or more of an acceleration capability, a hybrid battery state of charge, a destination of the vehicle 10, an onboard fuel value, etc. The acceleration capability of the AV 10 is based upon the vehicle's engine, motors and drivetrain characteristics. For example, AV 10 gasoline engine can produce 208 kilowatts (kWs) and AV 10 two motors can each produce an additional 45 kW for a total of 298 kWs. Taking in the characteristics of the drivetrain and the total weight of the vehicle and occupants, AV 10 acceleration capability is that AV 10 can accelerate from zero to 70 m.p.h or 108 k.p.h. in 5.5 seconds when the hybrid battery is sufficiently charged.

While the AV 10a is waiting for a message providing AV trajectory information and an ingress start time, the AV 10a is positioned in a queue of zero or more other AVs 10b in a waiting zone 46 of the buffer lane 42. The waiting zone 46, using a lane proximity sensors, a lane speed measuring device and cameras as discussed above, can report a waiting zone status to the server 18. The waiting zone status is obtained from the AV 10a via a communications link from the AV 10a to the server 18, for example, using the DSRC as discussed above. The waiting zone status can include a number of AVs 10 in the queue and an AV identification, an AV acceleration capability, an AV destination, etc.

To determine the AV trajectory, the server 18 uses the AV identification, the AV acceleration capability and the AV destination of the AV 10 along with a trajectory of a vehicle 10a in the AV lane 40. Vehicle 10a information used to determine a current and/or plan a future trajectory can include, for example, a vehicle 10a identifier (which allows the server 18 to obtain information applicable to the vehicle 10a), a velocity of the vehicle 10a, a geolocation of the vehicle 10a, etc.

When an egressing vehicle 10c is leaving the AV lane 40, if the vehicle 10c is capable of semiautonomous operation, i.e., receiving at least some inputs for control from a human driver, then the vehicle 10c can return from a fully autonomous mode to the semiautonomous mode. The server 18 can use data provided by the server 18 to determine that the semiautonomous merge zone 47 is capable of receiving the egressing vehicle 10c. If, for example, the semiautonomous merge zone 47 is congested or if the velocity of vehicles in the semiautonomous merge zone 47 is slower that the AV lane 40, the server 18 will adjust the vehicle trajectory accordingly. For example, the adjusted trajectory can involve a rapid deceleration to successfully complete the egress maneuver.

Additionally, the AV roadway infrastructure server 18 can also provide information regarding the flow of traffic in the AV lane 40, for example, the server 18 can send a velocity plot of the AV lane 40 to the server 18. The velocity plot can be, for example, a representation of suggested AV velocities for the vehicle 10a and the AV 10c. The velocity plot can include a maximum velocity and the minimum velocities for certain areas, for example, the velocities between the ingress point and the proceeding five miles can have a maximum velocity of 70 m.p.h. and minimum velocity of 55 m.p.h.

The AV roadway infrastructure server 18 can also monitor the AV lane 40 for potential problems or alerts and can signal the server 18 and the AV 10a with problems or alerts, for example, warnings of a collision ahead, sudden vehicular braking ahead, approaching emergency vehicle warning, vehicle safety inspection ahead, commercial vehicle clearance and safety inspections ahead and potential rollover warnings.

If the AV lane 40 is part of a toll road, the AV roadway infrastructure server 18 can determine a toll based on the vehicle identity and the vehicle destination. For example, AV 10 is a passenger car and ingresses at a first merge point. The AV 10 sends its vehicle identity indicating that the AV 10 is a passenger vehicle and leave the AV lane in 10a miles to the server 18. The server 18 can then calculate the per mile charge for a passenger vehicle and debit an appropriate toll account of the vehicle 54.

Process Flow

Figure 3:
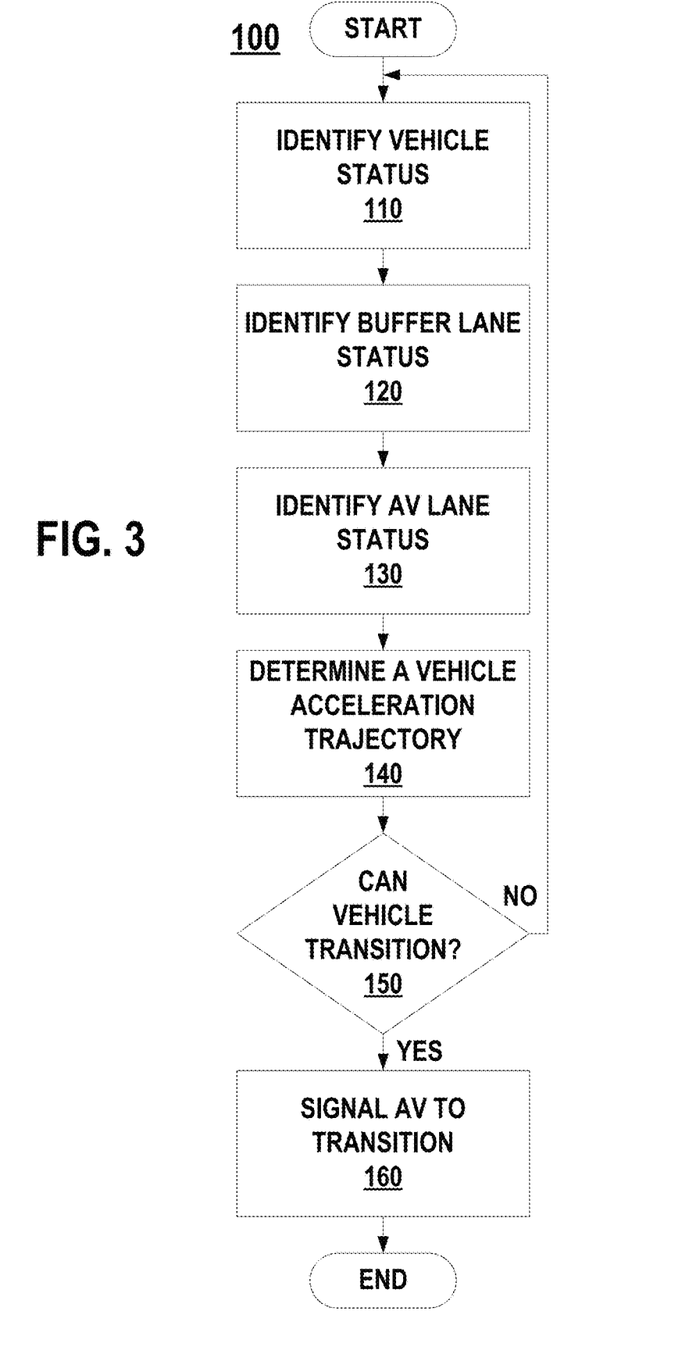
FIG. 3 is a flowchart of an exemplary process that may be implemented by the autonomous vehicle lane access control system of FIG. 1.

FIG. 3 is a flow chart illustrating an exemplary process 100 of the system 5 to control autonomous vehicle lane access.

The process 100 begins in a block 110, which can also follow a block 150. In the block 110, a vehicle status of the AV 10b is sent to the server 18. The AV 10b determines its vehicle status from, for example, data provided by one or more onboard electronic control units (ECUs) such as are known. The vehicle status can include one or more quantities related to AV 10 operation, e.g., a current vehicle speed, a vehicle identify, a vehicle acceleration capability, a vehicle destination, a current battery state of charge, an acceleration profile and/or other similar information related to determining the vehicle trajectory.

Next, in a block 120, the server 18 receives a waiting zone status from the server 18. The waiting zone status can include a number of AVs 10b in the queue, an AV 10 identifier, an AV 10b acceleration capability, an AV 10b destination and/or an exception status, etc. The exception status, for example, can be an indication that an incident occurred on the AV lane 40 and that there is a temporary ban on AVs 10b entering the AV lane 40.

Next, in a block 130, the server 18 receives an autonomous vehicle information regarding the trajectory of the vehicle 10a in the AV lane 40 from the AV roadway infrastructure server 18. As discussed above, the AV roadway infrastructure server 18 can send the trajectory or the components required for the server 18 to calculate the TAV trajectory. The AV server 18 can additionally send to the server 18 an AV lane status, which can include, for example and without limitation, a traffic lane vehicle spacing, an AV lane accident status, i.e., whether there are any accidents blocking or affecting the lane, whether there are any sudden vehicles braking ahead, an approaching emergency vehicle warning, vehicle safety inspection ahead, commercial vehicle clearance and safety inspections ahead and potential rollover warnings.

Next, in a block 140, the system 100 determines the AV 10b trajectory. The AV 10b trajectory, for example, is based upon such factors as the AV acceleration capability, meteorological conditions, the velocity of the vehicle 10b in the AV lane 40 and the spacing between the AV vehicles 10a. For example, AV 10 acceleration capability on dry pavement could be 35 m.p.h. per second or 15.8 m/s^2. Therefore, it will take approximately seven seconds for AV 10 to achieve an AV lane velocity of 70 m.p.h. or 112 km/s, and the distance traveled will be approximately a quarter mile or 398 meters. In order for the AV 10 to successfully and safely merge in front of AV 10a with a safe buffer distance of approximately 50 yards or 46 meters, the AV 10a should be 490 yards from AV 10 ingress point on to the AV lane 40 when the AV 10 is released from the waiting zone 46.

If the AV lane 40 and/or the buffer lane 42 is wet or slippery, the acceleration capability of the AV 10 diminishes due to the loss of traction. For example, when a roadway is wet, AV acceleration capability can drop to 25 m.p.h./s or 11.2 m/s^2. It will now take ten seconds to get up to the AV lane velocity of 70 m.p.h. or 112 km/s and will require 612 yards or 560 meters. Therefore, AV 10 should be released from the waiting zone 46 when the AV 10a is at least 662 yards or 600 meters from the ingress point.

Next, in the block 150, the server 18, using the determinations described above concerning the block 140, determines if the AV 10 can leave the waiting zone 46 and safely merge into the AV lane 40. If the server 18 determines that a safe ingress is not possible, that is, the AV 10a is too close to the ingress point, the process 100 returns to in the block 110, else the process 100 continues to in a block 160.

Next, in a block 160, the server 18 sends a release message to AV 10 to release any braking forces applied to AV 10 brakes and actuate propulsion (e.g., an electric motor and/or internal combustion engine) and steering and proceed with the AV 10 ingress maneuver. Following the block 180, the process 100 ends.

Figure 4:
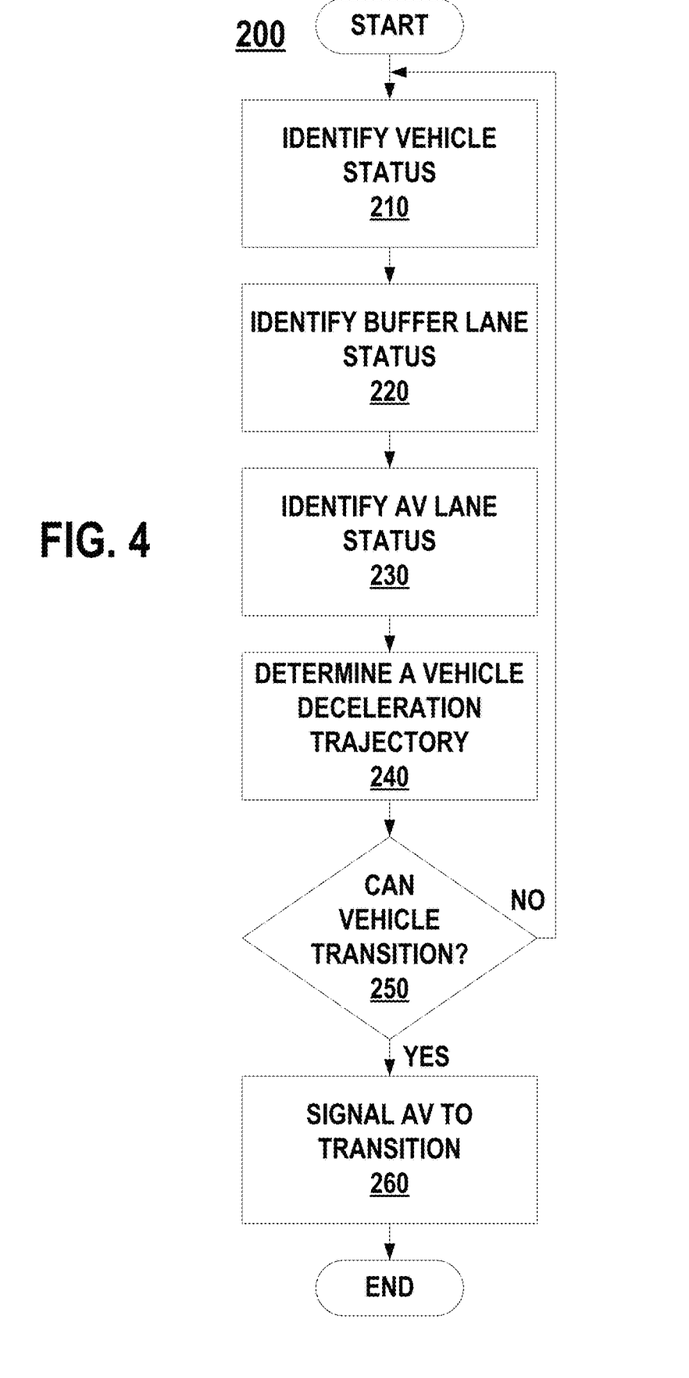
FIG. 4 is a flowchart of another exemplary process that may be implemented by the autonomous vehicle lane access control system of FIG. 1.

FIG. 4 is a flow chart illustrating an exemplary process 200 of the system 5 for autonomous vehicle lane access control.

The process 200 begins in a block 210, which can also follow a block 250. In the block 210, a vehicle 10c status of the egress vehicle 10c is sent to the server 18. The vehicle 10c determines the vehicle status from onboard electronic control unit (ECUs) data. The vehicle status can include one or more quantities related to vehicle 10c operation, e.g., a current vehicle speed, a vehicle identify, a vehicle acceleration capability, a vehicle deceleration capability, a vehicle destination, a current battery state of charge, an acceleration profile and/or other similar information related to determining the vehicle transition profile. It should be noted that braking or slowing a vehicle is considered a negative acceleration.

Next, in a block 220, the server 18 receives an egress buffer lane status of the semiautonomous merge zone 47 from the server 18. The egress buffer lane status can include the number of vehicles in the semiautonomous merge zone 47 and their trajectories and the environmental status.

Next, in a block 230, the server 18 receives the AV lane status of the AV lane 40 from the AV roadway infrastructure server 18. The AV lane status can include, for example, the trajectories of any AV proximate to (e.g., within a predetermined distance of) the egressing vehicle 10c.

Next, in a block 240, the system 200 determines an update AV trajectory for the vehicle 10c, which can include the deceleration capability of the vehicle 10c, the meteorological conditions and possible vehicles in the semiautonomous merge zone 47.

Next, profile in the block 210, the server 18 determines if the egress vehicle 10c can leave the AV lane 40 and merge into the buffer lane 42. For example, the vehicle 10c is traveling at 70 m.p.h. or 112 km/s and the maximum velocity of the semiautonomous merge zone 47 is 35 m.p.h. or 56 km/s. The vehicle 10c will have to decrease velocity by 35 m.p.h. or 56 km/s. The vehicle 10c can comfortably decelerate at a negative 8 m.p.h./s or 3.5 m/s^2. In order for the vehicle 10c to reach 35 m.p.h. or 56 km/s, the server 18 would have to have the vehicle 10c begin it deceleration 1033 yards or 945 meters before egressing the AV lane 40 and enter the semiautonomous merge zone 47.

If the server 18 determines that a safe egress is not possible, for example, due to an accident in the semiautonomous merge zone 47, the process 200 returns to in the block 210, else the process 200 continues to in a block 260.

Next, in a block 260, the processing unit sends a message to the egress vehicle 10*c* to apply braking forces, reduce the means of propulsion and effectuate the steering to perform the egress maneuver. Following the block 260, the process 200 ends.

CONCLUSION

As used herein, the adverb "substantially" modifying an adjective means that a shape, structure, measurement, value, calculation, etc. may deviate from an exact described geometry, distance, measurement, value, calculation, etc., because of imperfections in the materials, machining, manufacturing, sensor measurements, computations, processing time, communications time, etc.

Computing devices such as those discussed herein generally each include instructions executable by one or more computing devices such as those identified above, and for carrying out blocks or steps of processes described above. Computer executable instructions may be compiled or interpreted from computer programs created using a variety of programming languages and/or technologies, including, without limitation, and either alone or in combination, Java™, C, C++, C#, Visual Basic, Python, Java Script, Perl, HTML, PHP, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

What is claimed is:

1. A system, comprising a server computer having a processor and a memory, the memory storing instructions executable by the processor such that the computer is programmed to:
    detect a first vehicle in a first lane adjacent to a second lane;
    plan a first vehicle trajectory for the first vehicle to be placed in a queue in the first lane and, from the queue, transition from the first lane to the second lane based upon two or more determined characteristics of the first vehicle and a second vehicle trajectory, wherein the determined characteristics include a first vehicle acceleration capability and a first vehicle destination; and
    control the first vehicle based upon the first vehicle trajectory.

2. The system of claim 1, wherein the characteristics includes one or more of a first vehicle identity and a first vehicle status.

3. The system of claim 1, wherein the server computer is further programmed to detect a second vehicle in the second lane.

4. The system of claim 1, wherein the server computer is further programmed to determine at least one of the second vehicle trajectory and the planned first vehicle trajectory from data received from one or more of a first lane proximity sensor, a first camera and a first lane speed measuring device.

5. The system of claim 1, wherein the server computer is further programmed to determine at least one of the second vehicle trajectory and the planned first vehicle trajectory in part from weather data.

6. The system of claim 1, wherein the server computer is further programmed to determine at least one of the second vehicle trajectory and the planned first vehicle trajectory in part from traffic data.

7. The system of claim 1, wherein the server computer is further programmed to receive at least a second vehicle identity, a second vehicle geolocation, and a second vehicle velocity.

8. The system of claim 1, wherein the first vehicle is capable of a semi-autonomous mode of operation in addition to an autonomous mode of operation.

9. The system of claim 1, wherein the server computer is further programmed to:
    plan a first vehicle trajectory for the first vehicle to transition from the second lane to the first lane based upon at least the first vehicle destination, the second vehicle trajectory and a status of the first lane; and control the first vehicle based upon the first vehicle trajectory.

10. A method comprising:
    detecting a first vehicle in a first lane adjacent to a second lane;
    detecting a second vehicle in the second lane;
    planning a first vehicle trajectory for the first vehicle to be placed in a queue in the first lane and, from the queue, transition from the first lane to the second lane based upon two or more determined characteristics of the first vehicle and a second vehicle trajectory, wherein the determined characteristics include a first vehicle acceleration capability and a first vehicle destination; and
    controlling the first vehicle based upon the first vehicle trajectory.

11. The method of claim 10, wherein the characteristics include one or more of a first vehicle identity and a first vehicle status.

12. The method of claim 10, further comprising determining at least one of the second vehicle trajectory and the planned first vehicle trajectory from data received from one or more of a first lane proximity sensor, a first camera, and a first lane speed measuring device.

13. The method of claim 10, further comprising determining at least one of the second vehicle trajectory and the planned first vehicle trajectory in part from weather data.

14. The method of claim 10, further comprising determining at least one of the second vehicle trajectory and the planned first vehicle trajectory in part from traffic data.

15. The method of claim 10, further comprising receiving at least a second vehicle identify, a second vehicle geolocation, a second vehicle velocity.

16. The method of claim 10, wherein the first vehicle is capable of a semi-autonomous mode of operation in addition to an autonomous mode of operation.

17. The method of claim 10, further comprising:
    determining a plan a first vehicle trajectory for the first vehicle to transition from the second lane to the first lane based upon at least the first vehicle destination, the second vehicle trajectory and a status of the first lane; and
    controlling the first vehicle based upon the first vehicle trajectory.

18. An apparatus for controlling an ingress of a first vehicle from a first lane to a second lane, comprising
    a processor programmed to:
    determine a first vehicle geolocation;
    based on the first vehicle geolocation, roadway infrastructure network data, and a second vehicle trajectory, determine a first vehicle trajectory of the first vehicle;
    determine an ingress start time for the first vehicle to ingress the second lane from the first lane; and
    send a control message to the first vehicle to execute the first vehicle trajectory for the start of the ingress at the ingress start time.

19. The apparatus of claim 18, wherein the processor is further programmed to determine the second vehicle trajectory from at least a second vehicle identity, a second vehicle geolocation, a second vehicle velocity.

20. The apparatus of claim 18, wherein the processor is further programmed to determine at least one of the second vehicle trajectory and the first vehicle trajectory in part from traffic data.

* * * * *

UNITED STATES PATENT AND TRADEMARK OFFICE
CERTIFICATE OF CORRECTION

Page 1 of 1

PATENT NO. : 9,821,809 B2
APPLICATION NO. : 14/992089
DATED : November 21, 2017
INVENTOR(S) : Hassene Jammoussi It is certified that error appears in the above-identified patent and that said Letters Patent is hereby corrected as shown below:

In the Claims

In Claim 2, Column 8, Line 36, replace "includes one or more" with "include one or more"

Signed and Sealed this
Thirtieth Day of January, 2018

Joseph Matal
*Performing the Functions and Duties of the
Under Secretary of Commerce for Intellectual Property and
Director of the United States Patent and Trademark Office*